United States Patent
Renner

(10) Patent No.: US 11,113,351 B2
(45) Date of Patent: Sep. 7, 2021

(54) AGGREGATED SEARCH ENGINE QUERY ANALYSIS

(71) Applicant: TD Ameritrade IP Company, Inc., Omaha, NE (US)

(72) Inventor: Joel Christopher Renner, Ballwin, MO (US)

(73) Assignee: TD Ameritrade IP Company, Inc., Omaha, NE (US)

(*) Notice: Subject to any disclaimer, the term of this patent is extended or adjusted under 35 U.S.C. 154(b) by 192 days.

(21) Appl. No.: 16/442,690

(22) Filed: Jun. 17, 2019

(65) Prior Publication Data

US 2020/0394236 A1  Dec. 17, 2020

(51) Int. Cl.
| | |
|---|---|
| G06F 7/02 | (2006.01) |
| G06F 16/00 | (2019.01) |
| G06F 16/9535 | (2019.01) |
| G06Q 40/04 | (2012.01) |
| G06F 16/955 | (2019.01) |
| G06F 16/2457 | (2019.01) |

(52) U.S. Cl.
CPC .... *G06F 16/9535* (2019.01); *G06F 16/24578* (2019.01); *G06F 16/9558* (2019.01); *G06Q 40/04* (2013.01)

(58) Field of Classification Search
CPC ............. G06F 16/9535; G06F 16/9558; G06F 16/24578; G06F 16/951; G06F 16/953; G06F 16/80; G06F 16/26; G06F 16/20; G06F 16/256; G06Q 40/04; G06Q 40/06
See application file for complete search history.

(56) References Cited

U.S. PATENT DOCUMENTS

| | | | | |
|---|---|---|---|---|
| 8,195,653 | B2 * | 6/2012 | Dandekar | G06F 16/9537 707/724 |
| 8,359,309 | B1 * | 1/2013 | Provine | G06F 16/951 707/721 |
| 9,348,911 | B2 * | 5/2016 | Egendorf | G06F 16/951 |
| 2012/0290503 | A1 * | 11/2012 | Robert | G06Q 40/04 705/36 R |
| 2015/0032741 | A1 * | 1/2015 | Liu | G06F 40/284 707/725 |
| 2019/0278776 | A1 * | 9/2019 | Villafane | G06F 16/9535 |

* cited by examiner

*Primary Examiner* — Bruce M Moser
(74) *Attorney, Agent, or Firm* — Harness, Dickey & Pierce, P.L.C.

(57) ABSTRACT

A method includes acquiring data from sources of search query data. The data indicates searches performed at multiple search engines. The method includes identifying a set of search terms from the data, determining a number of times each of the identified set of search terms was searched, and generating a search count for each of the identified set of search terms based on the number of times each of the identified set of search terms was searched. The method includes classifying, based on predetermined criteria, the searches for the identified set of search terms as being active or passive, assigning weights according to predetermined rules to each of the searches based on whether each of the searches is active or passive, and generating weighted search counts by multiplying the search counts with respective weights. The method includes generating a score indicating an interest level in the first search term.

22 Claims, 10 Drawing Sheets

| Account: | | | | | | ✻ Home Screen | ✉ Messages | ⟳ Support/Chat | ✻ Setup | ▭ ☐ ✕ |
|---|---|---|---|---|---|---|---|---|---|---|
| Monitor | Trade | Analyze | Scan | Charts | Tools | Education | Help | | | ⊕ OnDemand |
| ⌂ All Products | | ✧ Forex Trader | | | | ⋉ Futures Trader | | ⟡ Active Trader | | ✻ |
| VIXY ▽ ⬚ ▷ | | 24.67 | +.62 +2.58% | B: 24.67 A: 24.68 | | NASDAQ M̄M̄ | | ±0.514 | liq : 50.08 | |
| ▽ Underlying | | | | | | | | | | |
| ≪ | Last X | Net Chng | | Bid X | | Ask X | Size | Volume | Open | High | Low |
| | 24.67 Q | +.62 | | 24.67 P | | 24.68 P | 2×17 | 1,865,108 | 24.55 | 24.98 | 24.1315 |

FIG. 8

AGGREGATED SEARCH ENGINE QUERY ANALYSIS

FIELD

The present disclosure relates generally to systems and methods for analyzing searches performed for search terms and more particularly to analyzing the searches to detect interest levels in the search terms.

BACKGROUND

People search various securities (e.g., stocks, mutual and index funds, and so on) to obtain information about the securities. For example, to obtain information about a security, people enter a ticker symbol for the security in a search window or a search box on a web page or an application (app) on a mobile phone. The information typically includes a price of the security. The information may also include other data for the security such as daily and average volumes, price-to-earnings (P/E) ratio, dividend, dividend yield, ask price, bid price, 52-week high price, 52-week low price, and so on.

A financial services firm such as a brokerage firm typically has several trading platforms, which include different areas for people to search for different securities. For example, the brokerage firm may provide quote boxes on these different trading platforms. The quote boxes serve as search boxes for searching companies and/or ticker symbols. People may enter a company name or a ticker symbol in a quote box before making any trade (e.g., buy or sell a security).

Most financial services companies such as brokerage firms do nothing with the data that is available from the searches performed by people for various securities. For example, the data is not analyzed to investigate as to which companies or securities people are searching for, when are the people searching, which securities people buy or sell after performing the searches, etc.

Many brokerage firms expose their clients to various types of information such as news, quotes, recommendations regarding stocks to trade, etc. Most of the searches stemming from, or performed while consuming, these types of information are an indication of interest levels of people in the securities mentioned in these types of information. However, currently there is no way to quantify and correlate the search data.

The background description provided here is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

SUMMARY

A system includes a data acquisition module, a count determining module, a classification module, a weight determining module, a score generating module, and a query processing module. The data acquisition module is configured to acquire data from a plurality of sources of search query data via a communications network. The data indicates searches performed at a plurality of search engines. The data acquisition module is configured to identify a set of search terms from the data. The count determining module is configured to determine a number of times each of the identified set of search terms was searched and to generate a search count for each of the identified set of search terms. The classification module is configured to classify, based on predetermined criteria, the searches for the identified set of search terms as being active or passive. An active search is assigned a greater weight than a passive search. The weight determining module is configured to assign weights according to predetermined rules to each of the searches based on whether each of the searches is active or passive. The weight determining module is configured to generate weighted search counts by multiplying the search counts with respective weights. The score generating module is configured to generate a score for a first search term from the identified set of search terms as a ratio of a sum of the weighted search counts for the first search term to an average of previously generated weighted search counts for the first search term accumulated over a period of time. The score indicates an interest level in the first search term. In response to receiving a query for a current assessment for the first search term via the communications network, the query processing module is configured to obtain the current assessment for the first search term. The query processing module is configured to obtain the score for the first search term from the score generating module. The query processing module is configured to send a response to the query via the communications network. The response includes the score for the first search term and the current assessment for the first search term.

In another feature, obtaining the current assessment for the first search term includes obtaining a current price of an asset indicated by the first search term.

In another feature, the query processing module is configured to associate a hyperlink to with the score. The hyperlink is configured to provide additional information about the score, the asset indicated by the first search term, or both; and to include the hyperlink in the response.

In another feature, the query processing module is configured to receive an indication of activation of the hyperlink and to send the additional information in response to the activation of the hyperlink.

In other features, the current assessment for the first search term includes a plurality of parameters, and the system further includes a charting module configured to generate the additional information. The additional information includes a chart of scores for the first search term over a period of time, a chart of scores for the first search term versus one of the parameters for the first search term over a period of time, or a chart of scores for the first search term versus scores for a second search term over a period of time.

In other features, the system further includes a news processing module and a statistical analysis module. The news processing module is configured to receive a plurality of news items from over a period of time to associate with the first search term. The statistical analysis module is configured to obtain a first score for the first search term from a date of a first news item of the plurality of news items. The statistical analysis module is configured to determine a statistical significance of the first news item based on the first score and scores for the first search term over the period of time. The news processing module is configured to determine whether to emphasize or de-emphasize the first news item based on the statistical significance of the first news item.

In other features, the data acquisition module is configured to acquire additional data associated with searches performed for the first search term from the plurality of sources during a day. The score generating module is configured to update the score for the first search term during the day based on the additional data.

In other features, the data acquisition module is configured to acquire additional data associated with searches performed for the search terms from the plurality of sources during a day. The score generating module is configured to generate scores for the search terms during the day based on the additional data and to accumulate the scores in a database.

In other features, the data acquisition module is configured to acquire additional data associated with searches performed for the search terms from the plurality of sources during a day. The weight determining module is configured to generate additional weighted search counts for the search terms during the day based on the additional data. The weight determining module is configured to accumulate the additional weighted search counts for the search terms in a database.

In another feature, the score generating module is configured to reset to zero scores for the search terms at a time of a day.

In another feature, the data acquisition module is configured to acquire a portion of the data from one or more of the plurality of sources with permission from the one or more of the plurality of sources and by accessing the one or more of the plurality of sources via an application programming interface.

In still other features, a non-transitory computer-readable medium stores processor-executable instructions. The instructions include acquiring data from a plurality of sources of search query data via a communications network. The data indicates searches performed at a plurality of search engines. The instructions include identifying a set of search terms from the data. The instructions include determining a number of times each of the identified set of search terms was searched. The instructions include generating a search count for each of the identified set of search terms based on the number of times each of the identified set of search terms was searched. The instructions include classifying, based on predetermined criteria, the searches for the identified set of search terms as being active or passive. An active search is assigned a greater weight than a passive search. The instructions include assigning weights according to predetermined rules to each of the searches based on whether each of the searches is active or passive. The instructions include generating weighted search counts by multiplying the search counts with respective weights. The instructions include generating a score for a first search term from the identified set of search terms as a ratio of a sum of the weighted search counts for the first search term to an average of previously generated weighted search counts for the first search term accumulated over a period of time. The score indicates an interest level in the first search term. The instructions include receiving a query for a current assessment for the first search term via the communications network. The instructions include obtaining the current assessment for the first search term, obtaining the score for the first search term, and sending a response to the query via the communications network. The response includes the score for the first search term integrated with the current assessment for the first search term.

In another feature, obtaining the current assessment for the first search term includes obtaining a current price of an asset indicated by the first search term.

In other features, the instructions further include configuring a hyperlink to provide additional information about the score, the asset indicated by the first search term, or both. The instructions further include associating the hyperlink with the score and including the hyperlink in the response.

In other features, the instructions further include receiving an indication of activation of the hyperlink and sending the additional information in response to the activation of the hyperlink.

In other features, the current assessment for the first search term includes a plurality of parameters, and the instructions further include generating the additional information by generating a chart of scores for the first search term over a period of time, by generating a chart of scores for the first search term versus one of the parameters for the first search term over a period of time, or by generating a chart of scores for the first search term versus scores for a second search term over a period of time.

In other features, the instructions further include receiving a plurality of news items from over a period of time to associate with the current assessment for the first search term. The instructions further include obtaining a first score for the first search term from a date of a first news item of the plurality of news items. The instructions further include determining a statistical significance of the first news item based on the first score and scores for the first search term over the period of time. The instructions further include determining whether to emphasize or de-emphasize the first news item based on the statistical significance of the first news item.

In other features, the instructions further include acquiring additional data associated with searches performed for the first search term from the plurality of sources during a day. The instructions further include updating the score for the first search term during the day based on the additional data.

In other features, the instructions further include acquiring additional data associated with searches performed for the search terms from the plurality of sources during a day. The instructions further include generating scores for the search terms during the day based on the additional data. The instructions further include accumulating the scores in a database.

In other features, the instructions further include acquiring additional data associated with searches performed for the search terms from the plurality of sources during a day. The instructions further include generating additional weighted search counts for the search terms during the day based on the additional data. The instructions further include accumulating the additional weighted search counts for the search terms in a database.

In another feature, the instructions further include resetting to zero scores for the search terms at a time of a day.

In other features, the instructions further include acquiring a portion of the data from one or more of the plurality of sources with permission from the one or more of the plurality of sources. The instructions further include accessing the one or more of the plurality of sources via an application programming interface.

Further areas of applicability of the present disclosure will become apparent from the detailed description, the claims, and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings.

FIG. 8 depicts an example of a screenshot showing a quote for a security along with a score for the security displayed according to the present disclosure.

In the drawings, reference numbers may be reused to identify similar and/or identical elements.

DETAILED DESCRIPTION

Figure 1:
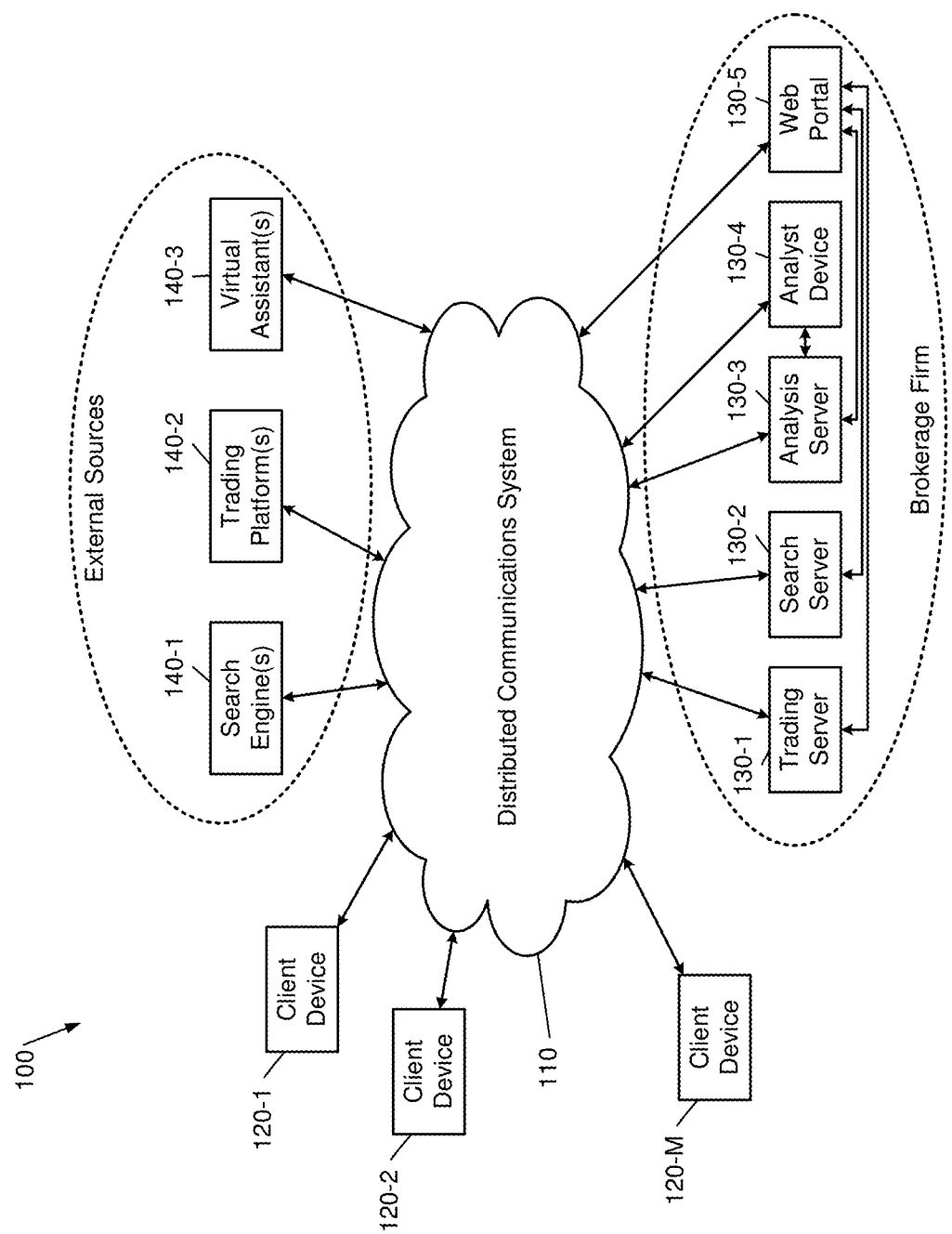
FIG. 1 shows a simplified example of a distributed computing system for implementing the systems and methods of the present disclosure.

The present disclosure relates to systems and methods for analyzing searches performed by people for companies and/or ticker symbols of securities, ranking the search data, and exposing that to clients as well as non-clients of a brokerage firm to indicate interest levels of people in different securities. The systems and methods can additionally collect search data from searches performed by people at other sources outside the brokerage firm (e.g., search engines such as Yahoo, Google, CNN, etc.; other trading platforms; and so on). Data from all of the above sources can be aggregated, and different weightings can be applied based on whether the searches were active or passive, which depends on where the searches occurred (on trading platform, mobile app, web portal), when the searches occurred (e.g., when orders were searched, entered, saved), and repeat frequencies of the searches for particular securities.

A score, which may be called Investor Interest Quotient (IIQ), is generated for a security based on the weighted searches for the security. The score for a security can indicate interest level of people in the security. The score can be displayed along with other data such as price and so on for the security. The score is determined based on aggregated and weighted search data and is used to show clients as well as non-clients how interested others are in a security. The score for a security is an objective representation of interest in the security that provides clients and non-clients with a simple and transparent way of evaluating information.

Specifically, the systems and methods compile search queries from multiple proprietary free-form text fields on trading platforms that accept ticker codes for financial products or that resolve to a ticker code for a financial product through the input of an underlying asset or company name. For example, a database can store actual quote lookups (counts) performed for a ticker code on one or more trading platforms of a brokerage firm, performed on a mobile app, performed through a watch list, or through a news search.

Then an algorithm is applied to the database that runs on the counts to produce real-time or near real-time outputs of scores. The algorithm can apply weights to the counts based on a desired output so that different visualizations of the score can be generated. For example, the database can define various classes of unit count weightings to compile a raw score value using the algorithm. Classes of weightings are based on active versus passive search behaviors employed by each user and are then aggregated. Different weightings can be applied based on where the search occurred, when the search occurred, and based on a repeat frequency of the search for the security.

The scores can range from 0-100 based on what percentage of the total database is attributable to a specific security. For example, if a ticker symbol XYZ's overall representation in the score database is P %, the ticker symbol XYZ would have a score of P, where P is an integer between 0-100. The score can be generated and displayed similar to any other fundamental indicator for a security and provides a simple way to compare different securities. Each day the database can re-establish (reset) each score on the platform (e.g., at 12:01 am) and update a maximum (cumulative) unit count in the database. A value of zero is then displayed as the current unit count for each score for the next day.

Notably, the scores according to the present disclosure differ from other conventional interest indicators such as volume, calls, puts, and so on. All of these other indicators are based on actual trades that have been already executed for a security. In other words, these other indicators indicate post-trade interest levels in securities.

In contrast, a score for a security according to the present disclosure indicates interest level of people in the security before the people actually execute trades for the security. Accordingly, the score for a security according to the present disclosure indicates pre-trade interest levels in the security, which can help people in many ways by providing pre-trading information that presently does not exist. The score, however, is not limited to pre-trading activities. The score can also take into account when securities are traded.

For example, most financial services companies like brokerage services currently provide quotes and news for securities, trending securities, and so on. Adding the scores to the quotes as described in the present disclosure makes the quotes more valuable since the scores simplistically inform clients how interested other people are in the quoted securities.

Unlike some other analytical tools, which are generally complex and therefore difficult to comprehend for non-savvy investors, the scores according to the present disclosure are easy to explain to people. For instance, simply put, a score is a simple way to understand the interest level, in terms of search, for the underlying instrument.

The score can be a gateway to more advanced analytics and education for people. By providing a simple numerical point of comparison in the form of a score, people may become more interested in learning about more advanced techniques.

The score according to the present disclosure is also very well-tailored for mobile experiences since a score is a simple number that provides people with important information.

Other potential benefits that can be derived by both consumers and brokerage firms alike include but are not limited to improved marketing to clients, improved news and information delivery to clients, a better understanding of client behaviors, and so on.

Figure 9:
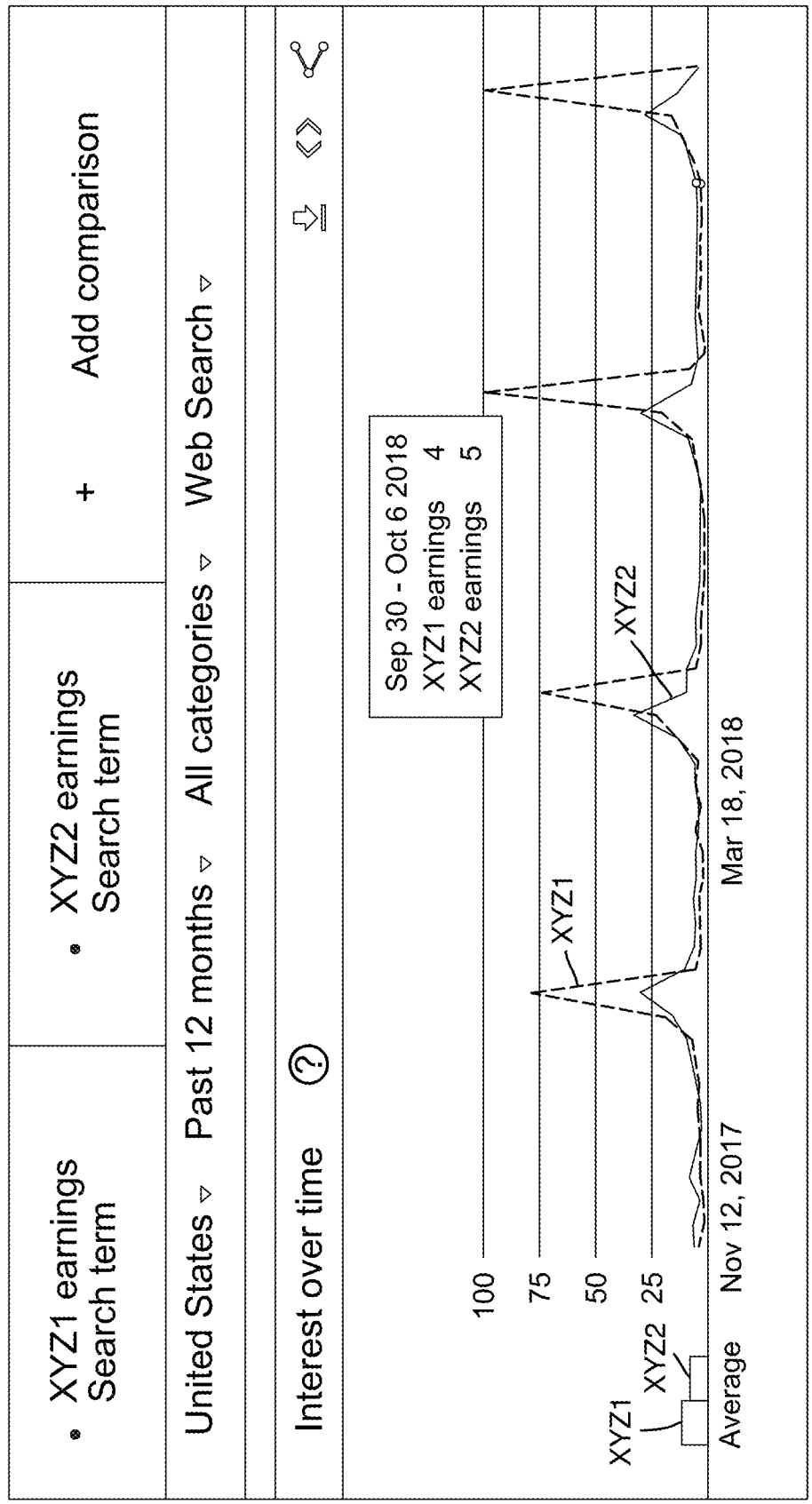
FIG. 9 depicts an example of a screenshot showing charts of scores of two securities for comparing variations in interest levels in the two securities according to the present disclosure.

The present disclosure is organized as follows. A general distributed computing environment in which the systems and methods of the present disclosure can be implemented is initially shown and described with reference to FIGS. 1-3. An example of a system for generating and displaying scores for securities and accentuating news for the securities based on the scores is shown and described with reference to FIG. 4. Various examples of methods for generating and displaying scores for securities and accentuating news for the securities based on the scores are shown and described with reference to FIGS. 5A, 5B, 6, and 7. Examples of screenshots showing how the scores can be displayed with quotes and how the scores can be used to further analyze securities (e.g., by using charts) are shown in FIGS. 8 and 9. Subsequently, additional details of the systems and methods of the present disclosure, including examples of calculating weights and scores and examples of use cases of the scores are described.

Block Diagrams

FIG. 1 shows a simplified example of a distributed computing system 100. The distributed computing system 100 is an example of a distributed computing environment in which the systems and methods of the present disclosure can be implemented. Throughout the description, references to terms such as servers, client devices, applications and so on are for illustrative purposes only. The terms server and client device are to be understood broadly as representing computing devices with one or more processors and memory configured to execute machine readable instructions. The terms application and computer program are to be understood broadly as representing machine readable instructions executable by the computing devices.

The distributed computing system 100 includes a distributed communications system 110; one or more client devices 120-1, 120-2, . . . , and 120-M, where M is an integer greater than or equal to one (collectively, client devices 120); one or more servers 130-1, 130-2, and 130-3 (collectively, servers 130); an analyst device 130-4; a web portal 130-5; and one or more of each of search engines 140-1, trading platforms 140-2, and virtual assistants 140-3.

For example, the servers 130 and the web portal 130-5 may be located at a brokerage firm's premises and/or in a cloud. The analyst device 130-4 may be implemented using one of the client devices 120. Each of the virtual assistants 140-3 may be implemented using one of the client devices 120. The search engines 140-1 and the trading platforms 140-2 may be implemented using one or more servers similar to the servers 130.

For example, the search engines 140-1 may include search engines provided by companies such as Yahoo, Google, CNN, and so on. People can search information such as price of securities using the search engines 140-1. The trading platforms 140-2 may belong to various financial services companies including brokerage firms. People can search information such as price of securities as well as trade securities using the trading platforms 140-2. The virtual assistants 140-3 may include virtual voice assistants provided by companies such as Apple, Google, and Amazon. People can search information such as price of securities using the virtual assistants 140-3.

At a brokerage firm, people including clients of the brokerage firm and non-clients may search for securities (e.g., using the web portal 130-5). The search server 130-2 can process these searches. Further, an analyst at the brokerage firm may interact with the servers 130 using the analyst device 130-4.

The distributed communications system 110 may include a local area network (LAN), a wide area network (WAN) such as the Internet, or other type of network. The following discussion about the client devices 120 applies to the analyst device 130-4 and the virtual assistants 140-3. The following discussion about the servers 130 applies to the search engines 140-1 and the trading platforms 140-2. The client devices 120 and the servers 130 may be located at different geographical locations and communicate with each other via the distributed communications system 110. The client devices 120 and the servers 130 connect to the distributed communications system 110 using wireless and/or wired connections.

While not shown, one or more securities exchanges may also be connected to the distributed communications system 110. Accordingly, the elements shown connected to the distributed communications system 110 can access one or more securities exchanges through the distributed communications system 110.

The client devices 120 may include smartphones, personal digital assistants (PDAs), tablets, laptop computers, personal computers (PCs), etc. The servers 130 may provide multiple services to the client devices 120. For example, the servers 130 may execute software applications developed by one or more vendors. The servers 130 may host multiple databases that are relied on by the software applications in providing services to users of the client devices 120. In some examples, one or more of the servers 130 execute one or more applications that implement the systems and methods of the present disclosure described below in detail.

Figure 2:
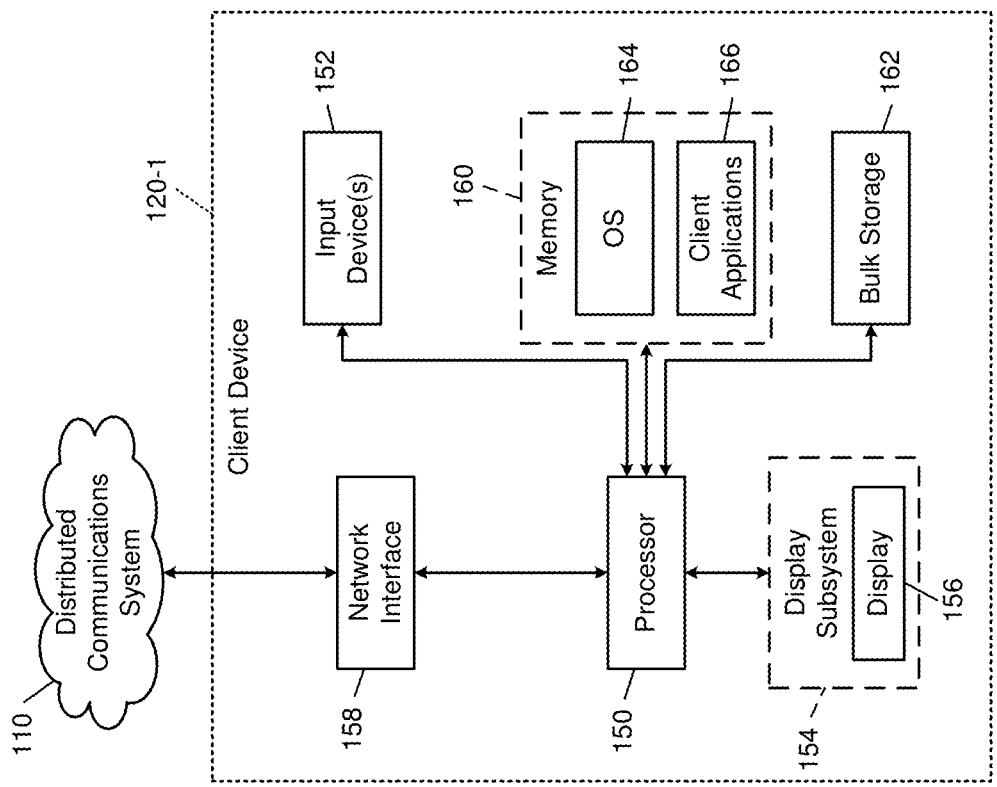
FIG. 2 shows a simplified example of a client device used in the distributed computing system.

FIG. 2 shows a simplified example of the client device 120-1. The client device 120-1 may typically include a central processing unit (CPU) or processor 150, one or more input devices 152 (e.g., a keypad, touchpad, mouse, touchscreen, etc.), a display subsystem 154 including a display 156, a network interface 158, memory 160, and bulk storage 162.

The network interface 158 connects the client device 120-1 to the distributed computing system 100 via the distributed communications system 110. For example, the network interface 158 may include a wired interface (for example, an Ethernet interface) and/or a wireless interface (for example, a Wi-Fi, Bluetooth, near field communication (NFC), or other wireless interface). The memory 160 may include volatile or nonvolatile memory, cache, or other type of memory. The bulk storage 162 may include flash memory, a magnetic hard disk drive (HDD), and other bulk storage devices.

The processor 150 of the client device 120-1 executes an operating system (OS) 164 and one or more client applications 166. The client applications 166 include an application that accesses the servers 130 via the distributed communications system 110.

Figure 3:
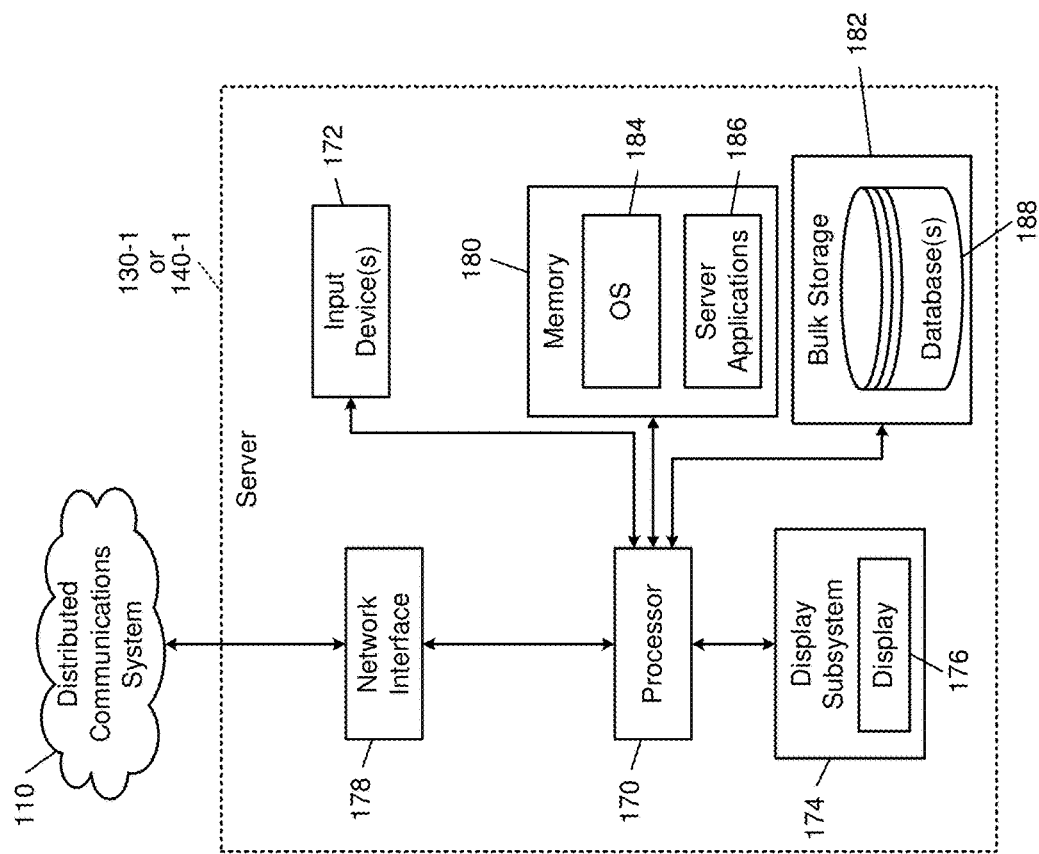
FIG. 3 shows a simplified example of a server used in the distributed computing system.

FIG. 3 shows a simplified example of the server 130-1. The server 130-1 typically includes one or more CPUs or processors 170, a network interface 178, memory 180, and bulk storage 182. In some implementations, the server 130-1 may be a general-purpose server and include one or more input devices 172 (e.g., a keypad, touchpad, mouse, and so on) and a display subsystem 174 including a display 176.

The network interface 178 connects the server 130-1 to the distributed communications system 110. For example, the network interface 178 may include a wired interface (e.g., an Ethernet interface) and/or a wireless interface (e.g., a Wi-Fi, Bluetooth, near field communication (NFC), or other wireless interface). The memory 180 may include volatile or nonvolatile memory, cache, or other type of memory. The bulk storage 182 may include flash memory, one or more magnetic hard disk drives (HDDs), or other bulk storage devices.

The processor 170 of the server 130-1 executes an operating system (OS) 184 and one or more server applications 186, which may be housed in a virtual machine hypervisor or containerized architecture, and which may include the systems and methods of the present disclosure. The bulk storage 182 may store one or more databases 188 that store data structures used by the server applications 186 to perform respective functions.

Figure 4:
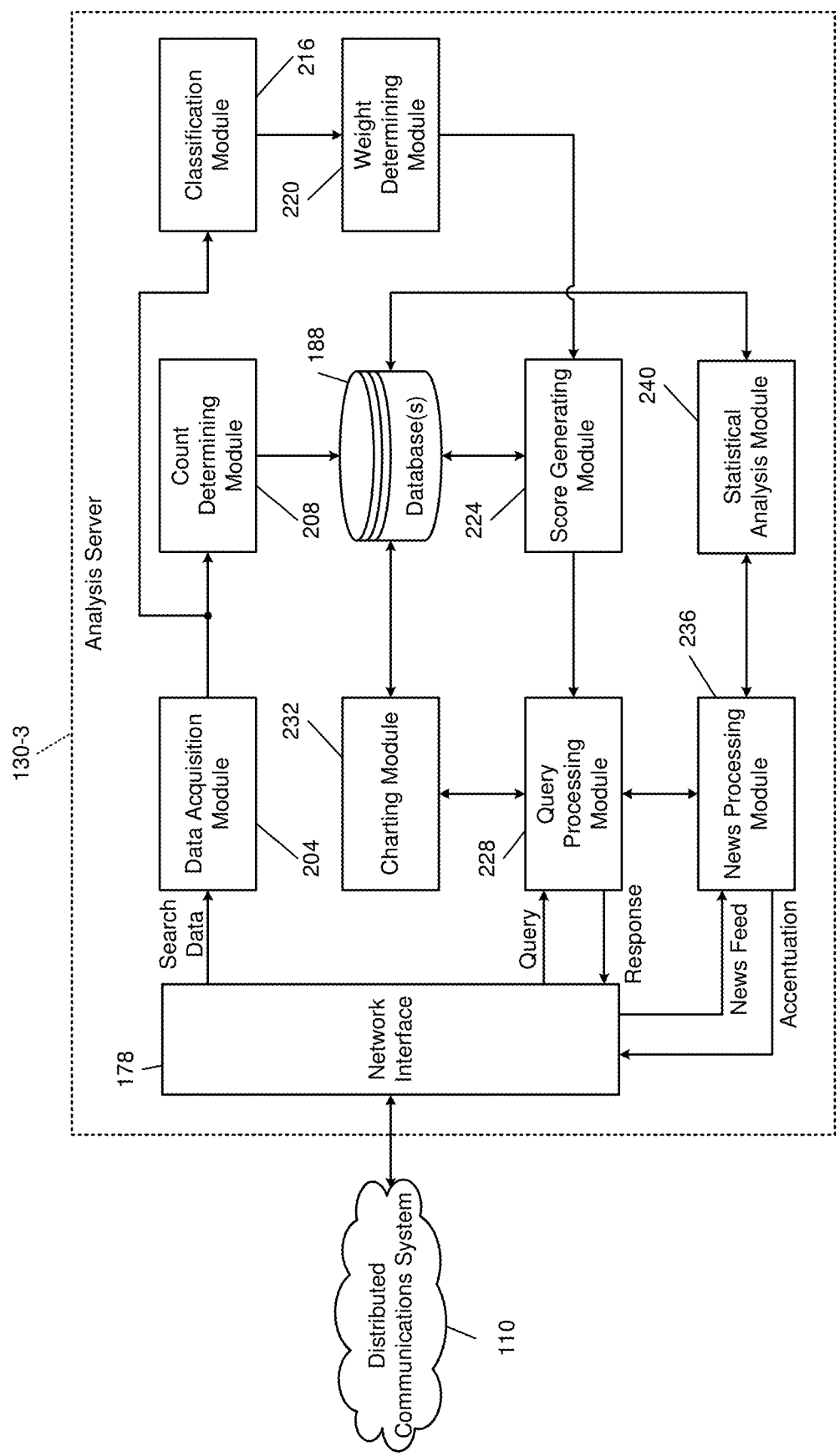
FIG. 4 is a functional block diagram of a system for generating and displaying scores for securities and accentuating news items associated with the securities based on the scores according to the present disclosure.

FIG. 4 shows a functional block diagram of a system for generating and displaying scores for securities and for accentuating news associated with the securities based on the scores according to the present disclosure. For example, the system is implemented by the analysis server 130-3. The system is described in detail with reference to FIGS. 5A, 5B, and 6-9. The system includes one or more modules (e.g., a weight determining module 220 described below) that include a manual admin function.

The system includes a data acquisition module 204, a count determining module 208, a classification module 216, a weight determining module 220, a score generating module 224, a query processing module 228, a charting module 232, a news processing module 236, and a statistical analysis module 240. The data acquisition module 204, the query processing module 228, and the news processing module 236 communicate with the distributed communications system 110 through the network interface 178 of the analysis server 130-3.

In the following description, the process of generating the scores is initially explained. Examples showing calculations involved in the process of generating the scores are provided later in the section titled "Examples of Weight and Score Calculations and Use Cases." Then the process of displaying the scores is described. Subsequently, the process of accentuating news related to a security based on the scores is explained.

The data acquisition module 204 collects search data related to searches for securities performed by users from various sources. For example, the various sources can include webpages, mobile apps, and so on of a brokerage firm. The various sources can also include other companies such as Yahoo, Google, CNN, and so on that also provide search engines (e.g., see the search engines 140-1 in FIG. 1), which can be used to search information about various securities. Further, the various sources can also include trading platforms of other financial services companies (e.g., see the trading platforms 140-2 in FIG. 1), virtual assistants (e.g., see the virtual assistants 140-3 in FIG. 1), and so on, which can be used to search information about various securities.

Furthermore, the various sources can also include news articles and watch lists for securities, and the search data can include data related to searches for securities originating from sources such as these news articles and watch lists for securities. For example, sometimes people reading a news article click on a ticker symbol or a company name mentioned in the new article, which yields information about the ticker symbol, and which constitutes a search for the security corresponding to the ticker symbol. Some people maintain a watch list of ticker symbols on websites of financial services companies and/or mobile apps. Each time a user visits such a webpage or app, the prices of the securities in the watch lists are searched and updated, without the user actively conducting the searches. These searches also constitute searches for the security corresponding to the ticker symbols in the watch lists but would potentially be weighted lower as described below.

From the collected search data, the data acquisition module 204 identifies the securities for which search has been performed. From the collected search data, the count determining module 208 determines the number of times each of the identified securities was searched. The number of times a security was searched is called the search count for the security. The count determining module 208 stores the search counts for each of the identified securities in one of the databases 188.

From the collected search data, the classification module 216 determines how many of the searches for each identified security were active versus passive. For example, active searches include but are not limited to searches originating from a mobile app, a quote search box (e.g., entered on a webpage), an order entry (i.e., an entry for placing a buy or sell order), and so on. In other words, active searches are searches that users have actively (directly and/or deliberately) entered into search boxes (search fields), quote boxes (quote request fields), order entry fields, etc. on webpages, mobile apps, and so on. Passive searches include but are not limited to searches originating from within news articles, watch lists of securities, and so on.

The weight determining module 220 determines weights to assign to the searches based on criteria including but not limited to whether the searches were active or passive. The weight determining module 220 assigns the determined weights to the searches. For example, the weight determining module 220 assigns a higher weight to the active searches and a lower weight to the passive searches. The weight determining module 220 generates weighted search counts for each of the identified securities based on the assigned weights. Examples of weights are provided later in the section titled "Examples of Weight and Score Calculations and Use Cases." The weight determining module 220 also includes a manual admin function to adjust the weights on the fly if needed.

The score generating module 224 generates a score for each of the identified securities. The score is a ratio of a sum of currently weighted search counts to an average of previously generated weighted search counts accumulated over a period (e.g., 3 months). Again, examples showing calculations involved in the process of generating the scores are provided later in the section titled "Examples of Weight and Score Calculations and Use Cases." The score generating module 224 stores the scores for each of the identified securities in one of the databases 188.

The data acquisition module 204 continues to acquire search data in real time or periodically in batches throughout the day. An accumulation data structure is maintained in one of the databases 188 to accumulate weighted search counts for each of the identified securities throughout the day. Additionally, the scores for each of the identified securities are also stored in one of the databases 188 throughout the day. These accumulated values are used for further analyses (e.g., charting etc.) as explained below.

The score generating module 224 daily resets the scores for all the identified securities to zero after a periodic interval (e.g., 24 hours) has elapsed. For example, the score generating module 224 may reset the scores to zero when a specific time of the day (e.g., 12:01 am) is reached. Thus, the score generating module 224 can provide fresh scores for the securities searched each day, where the scores indicate the interest levels of the people in the corresponding securities on the day of the search. In other words, a score for a security on a given day reflects the interest level of people in the security on the given day. Further, the score generating module 224 may update (refresh) the score during the day as more search data is collected. Accordingly, a score for a security at any given time during a day dynamically reflects the interest level of people in the security close to that time of the day.

As explained below, when a user requests a quote for a security, a score for the security is displayed along with other quote-related data that is typically displayed. Additionally, a hyperlink is associated with the score and is also displayed along with the score. The user can use the hyperlink to access additional information about the security based on the score. For example, the additional information may include but is not limited to comparisons of the score with the other data displayed in the quote for the security, comparisons of the score with scores of other securities, various charts, and so on.

The query processing module 228 receives a query from a user for a quote for a security. The query processing module 228 identifies the security in the query, obtains a quote for the security (e.g., from the trading server 130-1 shown in FIG. 1). Additionally, the query processing module 228 obtains the current score for the security directly from one of the databases 188 or from the score generating module 224.

The query processing module 228 sends a response to the user. The response includes the score for the security in addition to the quote related data for the security. For example, the other quote related data may include but is not limited to price, volume, P/E ratio, and so on for the security. The quote for the security including the score for the security is displayed on the user's device (e.g., the client device 120 shown in FIG. 1) or on the web portal 130-5 (also shown in FIG. 1). An example of a screenshot showing a quote and a score for a security is shown in FIG. 8.

Additionally, the query processing module 228 associates a hyperlink with the score to provide additional information about the security. The query processing module 228 displays the hyperlink with the score. For example, the query processing module 228 displays the hyperlink right under the score as seen in the screenshot in FIG. 8 showing the score with the associated hyperlink.

The query processing module 228 determines whether the hyperlink is activated by the user. The user may utilize the hyperlink in different ways. For example, the user may hover the cursor over the hyperlink or click on the hyperlink. For example, a limited amount of (i.e., abbreviated) additional information about the score and the security may be displayed in a small pop-up window when the user hovers the cursor over the hyperlink. On the other hand, when the user clicks on the hyperlink, the user may be directed to a new webpage or window where the user is presented with options for performing further analyses about the score and/or the security. The query processing module 228 determines that the hyperlink is activated when the user clicks on the hyperlink.

If the hyperlink is activated by the user, the query processing module 228 receives another query (e.g., from the user's device such as the client device 120 or from the web portal 130-5, both shown in FIG. 1). The query indicates that the user has activated the hyperlink. The query processing module 228 provides a response including additional options that can provide additional information about the score and/or the security. For example, the user may be able to view past scores for the security. Further, the user may be able to view charts of the past scores versus past prices (or any other parameter such as volume) for the security, for example. Further, the user may be able to view charts of the scores of the security versus scores of another security, and so on.

Often, when a quote for a security is obtained, some financial service companies provide news items related to the security in the form of a news feed. The news items are typically presented below the quote for the security in some order (e.g., chronological order). Some of the news items may be important while others may be unimportant or stale for the user. Aside from a small amount of information that can be gleaned from the title or the headline of the news items, the user has no way of knowing the relevancy of the content of the news items. The only way to ascertain the relevancy of the content of the news items is by reading each news item, which can be time consuming.

Instead, the news items can be accentuated in some manner based on the information content of the news items so that the user can navigate through the news items with ease and speed. For example, the news items displayed for a quoted security can be accentuated using the scores for the quoted security as follows.

The news processing module 236 receives or obtains the news feed that is to be associated (displayed) with the quoted security. The news processing module 236 determines a time period for display of the news items corresponding to the quoted security. The news processing module 236 identifies the news items corresponding to the quoted security for the time period.

The statistical analysis module 240 obtains scores for the quoted security over the time period, which are stored in one of the databases 188. The statistical analysis module 240 generates statistical parameters including but not limited to mean and standard deviation of the scores for the quoted security over the time period.

For a selected news item from the identified news items, the news processing module 236 determines if the score for the security on the date of the selected news item is more than one standard deviation greater or less than the mean. For example, the score for the security on the date of the selected news item may be greater than the mean by more than one, two, or three standard deviations or may be less than the mean by more than one, two, or three standard deviations.

If the score for the security on the date of the selected news item is more than one standard deviation greater than the mean, the news processing module 236 emphasizes the selected news item. For example, if the score for the security on the date of the selected news item is greater than the mean by more than one standard deviation, the news processing module 236 may display the selected news item in bold (on the user device or the web portal). Further, if the score for the security on the date of the selected news item is greater than the mean by more than two standard deviations, the news processing module 236 may display the selected news item in a bigger font size than the font size in which the other news items are displayed. Further, if the score for the security on the date of the selected news item is greater than the mean by more than three standard deviations, the news processing module 236 may display the selected news item in bold and in the bigger font size, and so on.

Conversely, if the score for the security on the date of the selected news item is more than one standard deviation less than the mean, the news processing module 236 may de-emphasize the display of the selected news item. For example, if the score for the security on the date of the selected news item is less than the mean by more than one standard deviation, the news processing module 236 may display the selected news item in a smaller font size than the font size in which the other news items are displayed. Further, if the score for the security on the date of the selected news item is less than the mean by more than two standard deviations, the news processing module 236 may not display the selected news item at all (i.e., the news processing module 236 may delete the selected news item altogether).

In other examples, a news item may also be emphasized or de-emphasized by changing the display order of the news items. For example, more important news items (determined using mean and standard deviation, for example) can be displayed above those that are relatively less important. This way, the user can quickly and easily see which news items are more relevant than other news items, without having to read all of the news items.

Flowcharts

Figure 5A:
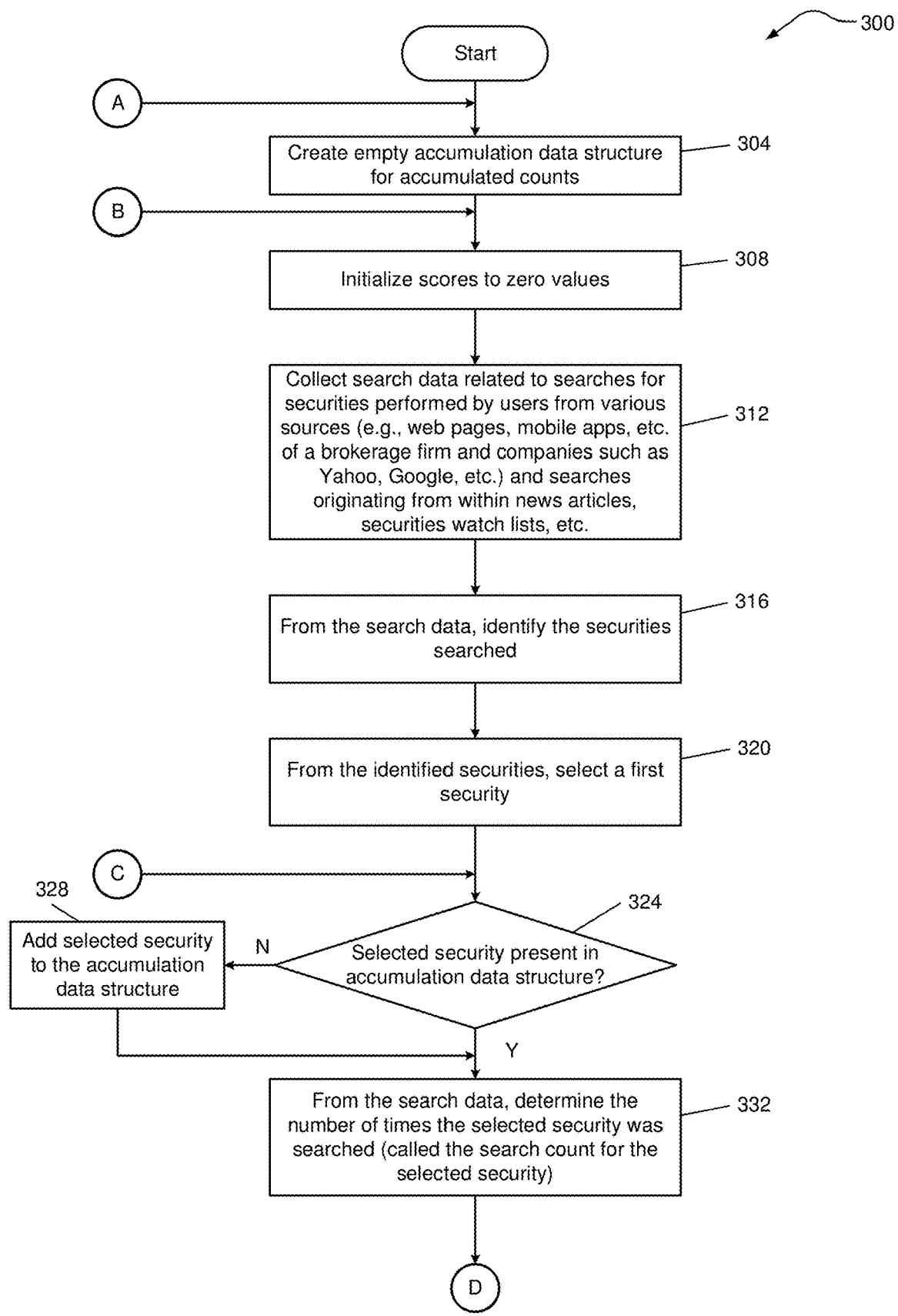
FIGS. 5A and 5B show a flowchart of a method for analyzing searches for securities performed by people and generating scores indicating interest levels of people in the securities according to the present disclosure.
Figure 5B:
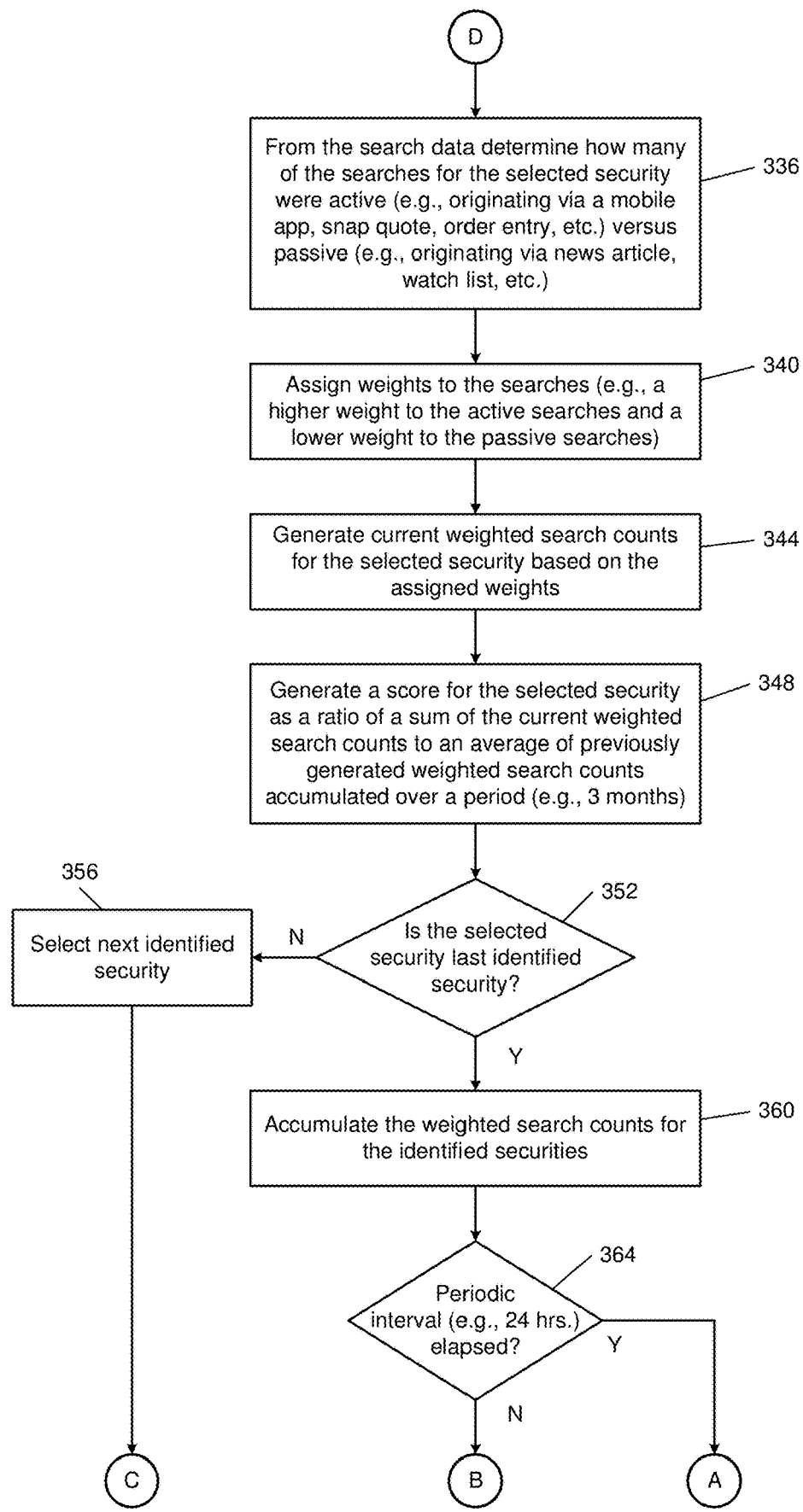

FIGS. 5A and 5B show a method 300 for analyzing various searches performed by people for different securities and for generating scores indicating interest levels of people in the different securities based on the analyses. For example, the method 300 may be executed by the analysis server 130-3 shown in FIGS. 1 and 3. For example, one of the server applications 186 and the databases 188 shown in FIG. 3 may implement the method 300.

In FIG. 5A, at 304, control creates an empty accumulation data structure to store accumulated counts for various securities. At 308, control initializes scores for the various securities to zero values.

At 312, control collects search data related to searches for securities performed by users from various sources. For example, the various sources can include webpages, mobile apps, and so on of companies such as a brokerage firm. The various sources can also include other companies such as Yahoo, Google, CNN, and so on that also provide search engines, which can be used to search information about various securities. Further, the various sources can also include trading platforms of other financial services companies, virtual assistants, and so on, which can be used to search information about various securities. In addition, the various sources can also include news articles and watch lists for securities, and the search data can include data related to searches for securities originating from sources such as these news articles and watch lists for securities.

At 316, from the collected search data, control identifies the securities for which search has been performed. At 320, from the identified securities, control selects a first security. At 324, control determines whether the selected security is present in the accumulation data structure. Control progresses to 328 if the selected security is not present in the accumulation data structure. At 328, control adds the selected security to the accumulation data structure. Control progresses to 332 if the selected security is present in the accumulation data structure at 324 or after adding the selected security to the accumulation data structure at 328.

At 332, from the collected search data (at 312), control determines the number of times the selected security was searched. The number of times the selected security was searched is called the search count for the selected security.

In FIG. 5B, at 336, from the collected search data (at 312 in FIG. 5A), control determines how many of the searches for the selected security were active versus passive. For example, active searches include but are not limited to searches originating from a mobile app, a quote search box (e.g., entered on a webpage), an order entry (i.e., an entry for placing a buy or sell order), and so on. For example, passive searches include but are not limited to searches originating from news articles, watch lists of securities, and so on.

At 340, control assigns weights to the searches. For example, control assigns a higher weight to the active searches and a lower weight to the passive searches. At 344, control generates current weighted search counts for the selected security based on the assigned weights. Examples of weighting schemes are provided later in the section titled "Examples of Weight and Score Calculations and Use Cases."

At 348, control generates a score for the selected security. The score is a ratio of a sum of the current weighted search counts to an average of previously generated weighted search counts accumulated over a period (e.g., 3 months). Again, examples showing calculations involved in the process of generating the scores are provided later in the section titled "Examples of Weight and Score Calculations and Use Cases."

At 352, control determines if the selected security is the last identified security (at 316 in FIG. 5A). Control progresses to 356 if the selected security is not the last identified security. At 356, control selects the next identified security, and control returns to 324 (in FIG. 5A). Control progresses to 360 if the selected security is the last identified security at 352. At 360, control accumulates the weighted search counts for the identified securities in the accumulation data structure.

At 364, control determines if a periodic interval (e.g., 24 hours) has elapsed. For example, control may determine if a specific time of the day (e.g., 12:01 am) is reached. If the periodic interval has not elapsed, control returns to 308 (in FIG. 5A). If the periodic interval has elapsed, control returns to 304 (in FIG. 5A).

Figure 6:
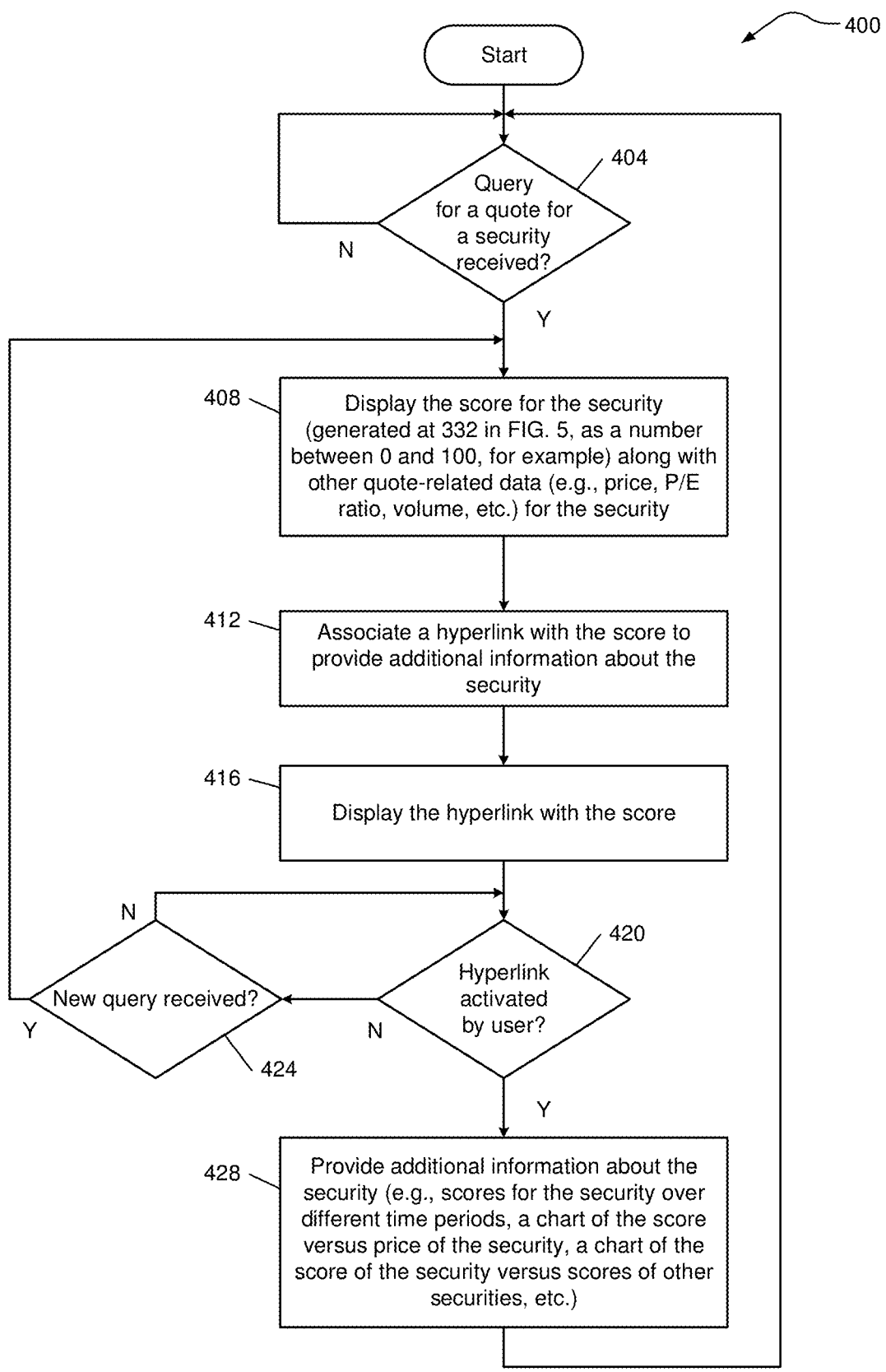
FIG. 6 is a flowchart of a method for displaying a score for a security along with other data displayed with a quote for the security according to the present disclosure.

FIG. 6 shows a method 400 for displaying the score along with other data typically displayed when a quote for a security is requested. The method 400 also displays a hyperlink with the score that can be used to access additional information based on the score such as comparisons of the score with the other data displayed in the quote for the security, comparisons of the score with scores of other securities, various charts, and so on, as explained blow.

For example, the method 400 may be executed partially by a client device (such as the client device 120-1 shown in FIGS. 1 and 2) and partially by the analysis server 130-3 (shown in FIGS. 1 and 3). For example, one of the client applications 166 shown in FIG. 2 may implement portions of the method 400. For example, one of the server applications 186 and the databases 188 shown in FIG. 3 may implement portions of the method 400.

At 404, control determines whether a query for a quote for a security is received. Control waits until a query for a quote for a security is received. Control progresses to 408 after a query for a quote for a security is received. At 408, control displays the score for the security along with other quote related data for the security. For example, the score displayed for the security may be a score generated at 332 in FIG. 5A. For example, the other quote related data may include but is not limited to price, volume, P/E ratio, and so on for the security. For example, see a screenshot in FIG. 8 showing the score displayed along with other quote related data for a security.

At 412, control associates a hyperlink with the score to provide additional information about the security. At 416, control displays the hyperlink with the score. For example, see the screenshot in FIG. 8 showing the score with the associated hyperlink.

At 420, control determines whether the hyperlink is activated by the user. The user may utilize the hyperlink in different ways. For example, the user may hover the cursor over the hyperlink or click on the hyperlink. For example, a limited amount of (i.e., abbreviated) additional information about the score and the security may be displayed in a small pop-up window when the user hovers the cursor over the hyperlink. On the other hand, when the user clicks on the hyperlink, the user may be directed to a new webpage or window where the user is presented with options for performing further analyses. Control determines that the hyperlink is activated when the user clicks on the hyperlink.

Control progresses to 424 if the hyperlink is not activated by the user. At 424, control determines whether a new query is received. Control returns to 420 (i.e., continues to display the score and the hyperlink) if no new query is received. Control returns to 408 if a new query for another security is received.

Control progresses to 428 if the hyperlink is activated by the user. At 428, control provides additional options that can provide additional information about the security. For example, the user may be able to view past weighted search counts for the security. Note that the score is what is displayed to the user in the user interface (UI) and what is behind the hyperlink is the unit count that drives the score. Further, the user may be able to view charts of the weighted search counts versus price (or any other parameter such as volume) for the security, for example. Further, the user may be able to view charts of the scores of the security versus unit counts of another security, and so on.

Figure 7:
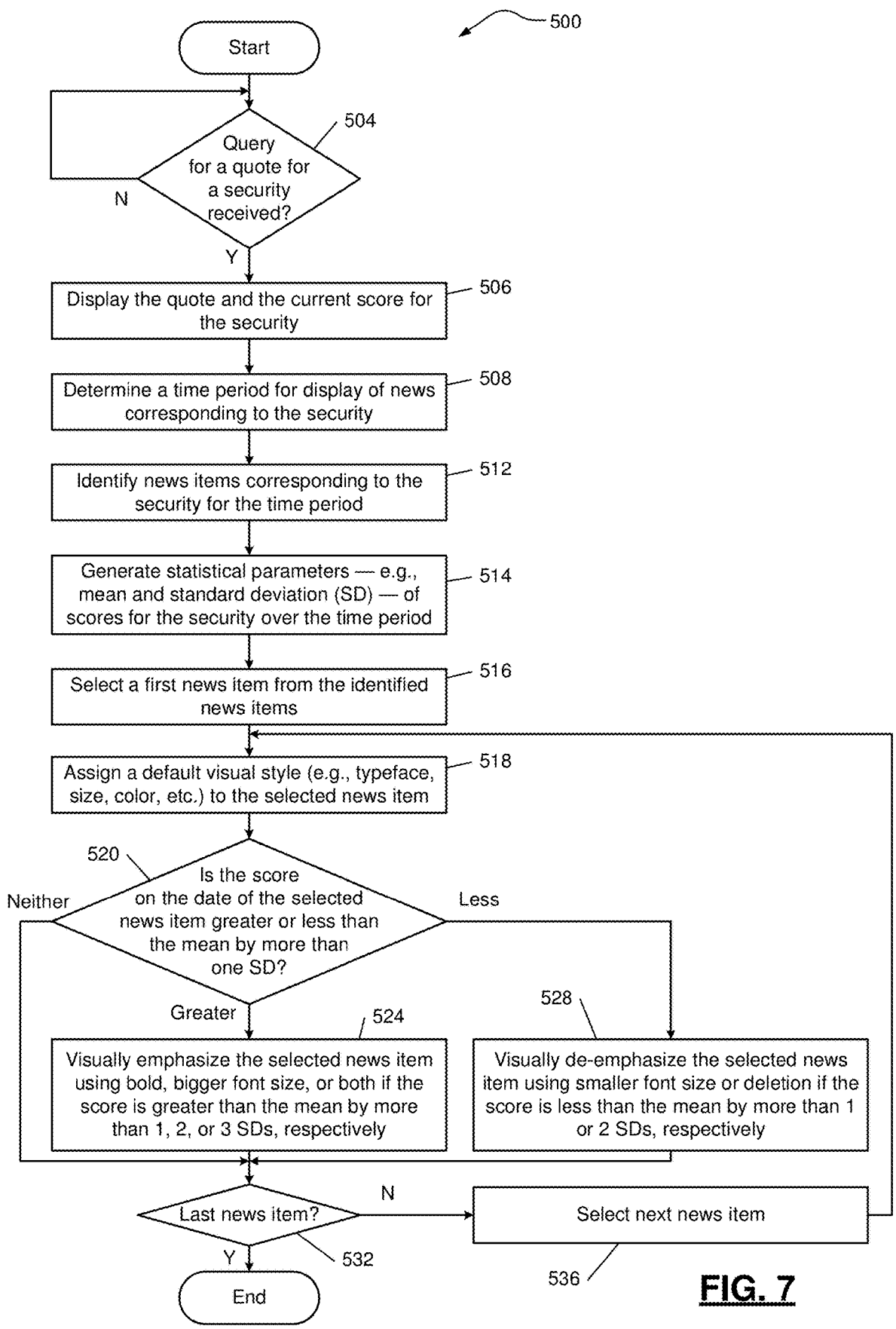
FIG. 7 is a flowchart of a method for accentuating news items displayed for a quoted security using the scores for the quoted security according to the present disclosure.

FIG. 7 shows a method 500 for accentuating news items displayed for a quoted security using the scores for the quoted security. For example, the method 500 may be executed by the analysis server 130-3 shown in FIGS. 1 and 3. For example, one of the server applications 186 and the databases 188 shown in FIG. 3 may implement the method 500.

At 504, control determines whether a query for a quote for a security is received. Control waits until a query for a quote for a security is received. Control progresses to 506 after a query for a quote for a security is received. At 506, control displays the quote and the current score for the security. At 508, control determines a time period for display of news items corresponding to the security. At 512, control identifies news items corresponding to the security for the time period. At 514, control generates statistical parameters such as but not limited to mean and standard deviation of the scores for the security over the time period.

At 516, control selects a first news item from the identified news items. At 518, control assigns a default visual style to the selected news item. For example, the default visual style may be a predetermined typeface, predetermined size, predetermined color, predetermined emphasis (such as bold, italic, or underline) or lack thereof, etc. At 520, control determines if the score for the security on the date of the selected news item is more than one standard deviation greater or less than the mean. For example, the score for the security on the date of the selected news item may be greater than the mean by more than one, two, or three standard deviations or may be less than the mean by more than one, two, or three standard deviations.

If the score is within one standard deviation of the mean, control transfers to 532. Control progresses to 524 if the score for the security on the date of the selected news item is more than one standard deviation greater than the mean. At 524, control emphasizes the selected news item. For example, if the score for the security on the date of the selected news item is greater than the mean by more than one standard deviation, the selected news item may be displayed in bold. In some implementations, the selected news item may be tagged with a logo or symbols used for the score (e.g., IIQ) and may have a hyperlink for further analysis. Further, if the score for the security on the date of the selected news item is greater than the mean by more than two standard deviations, the selected news item may be displayed in a bigger font size than the font size in which the other news items are displayed. Further, if the score for the security on the date of the selected news item is greater than the mean by more than three standard deviations, the selected news item may be displayed in bold and in the bigger font size, may be tagged, and so on.

Control progresses to 528 if the score for the security on the date of the selected news item is more than one standard deviation less than the mean. At 528, control de-emphasizes the selected news item. For example, if the score for the security on the date of the selected news item is less than the mean by more than one standard deviation, the selected news item may be displayed in a smaller font size than the font size in which the other news items are displayed. Further, if the score for the security on the date of the selected news item is less than the mean by more than two standard deviations, the selected news item may be deleted (or moved to the bottom of the list of the identified news items).

At 532, after emphasizing or deemphasizing the selected news item, control determines whether the selected news item is the last news item. Control progresses to 536 if the selected news item is not the last news item. At 536, control selects the next news item from the identified news items, and control returns to 518. Control ends if the selected news item is the last news item.

FIG. 8 shows an example of a screenshot showing a score displayed along with other quote related data for a security. The screenshot also shows a hyperlink displayed with the score. For example, the security is shown as a ticker symbol VIXY. Along with other quote-related data for the ticker symbol VIXY, a score for the ticker symbol VIXY is shown as an iiq value. A hyperlink is shown as an underline below the score value.

FIG. 9 shows an example of a screenshot showing charts of scores for two securities called XYZ1 and XYZ2. As can be seen, on average, the interest in XYZ1 was higher than in XYZ2. Further, the interest in both securities spiked higher around the time the securities announced their periodic earnings. Furthermore, the spikes in the interest in XYZ1 were of greater magnitude than the spikes in the interest in XYZ2. Additional observations can be made from the charts. For example, a tool tip or a popup window displays a period covered by the charts and the number of earnings announcements for the two securities during the period.

Examples of Weight and Score Calculations and Use Cases

The following is a general description of methods and systems for compiling search results or quotes and displaying performance of the searched securities as scores. The general description provides a method for compiling search queries and quantifying them through an algorithm to display a dynamic value, which can be used as a standalone value for display, or for display versus multiple quotient values in an analytics page of a financial service. The general description also includes examples of how to determine weights for the searches and how to calculate scores, and examples of use cases of the scores.

The method for compiling search queries can use one or more free-form text fields that accept ticker codes for financial products or that resolve to a ticker code for a financial product through the input of an underlying asset or company name. For example, the text fields may be provided in a proprietary service platform of a brokerage firm or financial services company. Additionally, the search queries may also originate from watch lists of securities maintained at the brokerage firm, news searches performed by clients and non-clients for ticker codes and/or search for company news performed through free form text field, and so on.

Further, the method for compiling search queries can also use searches executed from one or more free form text fields on search engines of third parties that accept ticker codes for financial products or that resolve to a ticker code for a financial product through the input of an underlying asset or company name (provided the third parties grant permission). For example, the third parties may include but are not limited to Yahoo finance, Google finance, CNN, MSNBC, and so on.

The method for compiling search queries can utilize an API or other automated method for transmitting, in real-time, web search query logs from the third parties, which can be ingested into a search database of the brokerage firm. An algorithm can be run on the search data stored in the search database. This algorithm can run against unit count data taken from the servers of the brokerage firm and the third parties to produce real-time or near real-time output of search quotient values called scores.

A database is used to store logs of unit counts compiled on the servers of the brokerage firm as well as logs from the third parties, which can be received via an API into the database of the brokerage firm. An algorithm is run on the unit count data to produce a variety of quotient values, which can then be queried to be displayed on an analytics visualization dashboard at the brokerage firm.

The database defines various classes of unit count weightings to compile a raw score using the algorithm. Classes of weighting are based on active versus passive search behavior employed by each user and are then aggregated. Below are non-limiting examples of the classes.

Count of ticker codes searched across a brokerage firm (i.e., across the product/service offerings of the brokerage firm); count of ticker codes searched across a third party; count of ticker codes searched via news; count of ticker codes searched via mobile apps; count of ticker codes searched via a watch list (upon loading the watch list); count of ticker codes searched via a screener (upon load); count of ticker codes searched via a quote search box; count of ticker codes searched via an order entry; count of ticker codes searched via a position page (upon load); and so on.

The algorithm runs on the unit count data from the database and translates, or computes in real-time, scores that are essentially sum totals of ticker code searches based on weightings. Below are non-limiting examples of the weightings for different classes.

1:1 weighting, for count of ticker codes searched across a brokerage firm (i.e., across the product/service offerings of the brokerage firm); 1:1 weighting, for count of ticker codes searched across a third party; 1:¼ weighting, for count of ticker codes searched via news; 1:1 weighting, for count of ticker codes searched via mobile apps; 1:¼ weighting, for count of ticker codes searched via a watch list; 1:¼ weighting, for count of ticker codes searched via a screener; 1:1 weighting, for count of ticker codes searched via a quote search box; 1:1 weighting, for count of ticker codes searched via an order entry; 1:¼ weighting, for count of ticker codes searched via a position page (upon load); 1:1 weighting, for count of ticker codes searched via an order status (upon load); 1:1 weighting, for count of ticker codes searched via a save order status (upon load); 1:1 weighting, for count of ticker codes searched via a trade tab (upon load of symbol); 1:1 weighting, for count of ticker codes searched via symbol search page (upon entry); and so on.

A quick score can be established and displayed similar to any other fundamental value or parameter typically found in a quote (e.g., price, volume, P/E ratio, etc.). The quick score is a % value per underlying financial product ticker code from 0-100. In some examples, the quick score is not listed as a percentage; rather, the quick score can be listed as a round number between 0.00 and 100.00 and can be rounded to the 0.01 place.

Each day the database can re-establish (reset) each score value at, for example, 12:01 am to update a maximum unit count in a database and to display a value of zero as the current day's unit count display. This way, each time a customer views a score, the score represents the % of the underlying ticker search for the current day versus a historical value, which is obtained by averaging the maximum unit counts from a time period (e.g., 3 months).

The quick score also supports a hyperlink to allow a customer to navigate to a customer analytics dashboard where score insights can be viewed over different periods of time and in comparison to other score data.

The quick scores are replaced by raw scores (unit count values) from the database to create a score display chart over time of its search. While the quick score can inform people if the search is up or down relative to an average, and for that day, the raw scores allow users to interact with raw unit counts of searches over different periods of time. Charts can be created of search volumes, and raw scores of a security can then be overlayed with raw scores of other securities or can be overlayed versus the price of the security, and so on.

After the scores are computed and stored, functional data can be pulled into a customer analytics (behavior) dashboard through a default view setting or a customized pull from customer inputs. An application can be utilized to allow the customers of the brokerage firm to change various inputs to receive different output views in the analytics dashboard.

For example, a default view can include the following aggregated score data. Top 10 most searched securities (customers are quoting these securities the most); top 10 most searched securities versus securities with least volume (customers are watching these securities the most); top 10 securities most correlated to the searched volume (customers are searching for these securities, buying them, and prices are moving up, or search has fallen off in combination with price).

Below are non-limiting examples of quick score calculation. As an example, the current count may be measured over the last 24 hours while the basis count is the average number of daily counts over three months.

For security XYZ1, with a 2,500,000 basis count and 1,500,000 current count, the Investor Interest Quotient (IIQ) would be 60.00.

For security XYZ2, with a 2,400,000 basis count and 250,000 current count, the IIQ would be 10.41.

For security XYZ3, with a 2,300,000 basis count and 2,300,001 current count, the IIQ would be 100.00.

In various implementations, the IIQ of a security may be charted over time. In other implementations, the raw counts (for example, one for each 24-hour period) of a security may be charted over time.

Thus, the raw number of web searches per financial instrument are tallied in real-time and counted (unit count). The relevance of different methods (active versus passive) to search for financial instruments is also examined to produce weighted tallies. The interest quotient value (i.e., the score) computed based on the weighted tallies can be directly comparable to other score values of financial instruments or can be viewed as a standalone value tracked over different time increments.

Below are non-limiting examples of use cases for the scores.

Use case 1: An investor wishes to validate how relevant a particular news release was to the interest of a stock as judged by the number of times the investors searched that security. The score helps in the validation process.

Use case 2: An investor wishes to validate a technical trading trend on a chart. To do this, the investor may use the designed charting functionality to overlay the investor interest quotient (i.e., the score) value as a lower indicator or bar versus the price levels of the underlying financial instrument.

Use case 3: An investor is noticing price of a stock move rapidly in one direction or another. If this price direction is driven by institutional trading, the investor may be able to confirm this by a noted lack of searched activity from retail investors like themselves.

Use case 4: A hedge fund wishes to gain an aggregated data feed of real-time aggregated searches of retail investors. In this case, the hedge fund may become a client of the brokerage firm providing the scores and purchase a data feed accessible via API of the brokerage firm's proprietary investor interest data suite which could include a real-time feed as well as historical searched data similar to data provided to the retail clients of the brokerage firm.

Use case 5: A distinction may be drawn between active and passive viewers. Logic from the various quote entry methods will help investors and hedge funds to determine whether the underlying financial instrument is being actively monitored by a large audience or is being quoted sporadically.

Use case 6: A stock with light average volume could tell a bigger story if the investor knew how many people were searching for, or watching it.

Use case 7: Identification of fraudulent activities on brokerage dealer platforms; the systems and methods of the present disclosure can help protect investing public when used in an enterprise solution. Sometimes investors can suffer losses by account takeover and pump and dump schemes on low priced (microcap) securities where information and volume of the security is limited because fraudsters can influence the price of the stock to a greater degree with unauthorized buys or sells. In an enterprise setting the data derived from the systems and methods of the present disclosure may allow brokerage firms to have an early warning sign that a security has an unusual or unexplained increase in interest. The score can be used as an indicator or contra-indicator of this type of activity.

In sum, the systems and methods of the present disclosure utilize the following general scheme to generate and utilize the scores:

A data feed coming from streams of weblogs is established to generate unit counts for tickers of financial product.

A logic identifies the type or stream of web logs (search logs) to be counted from various web services of the brokerage firm where the streams or logs of search data are produced.

An algorithm interacts with unit count database to derive raw scores based on weightings and associated formulae.

A new data field displays the score along with a quote for a security.

A new charting method overlays the score on a specific ticker symbol and specific chart.

A dashboard landing page allows investors to investigate trending of ticker symbols of investor's interest versus their peer ticker symbols and display a stack rank of the most relevant scores based on a default view.

A user interface (UI) with a controller allows customers to manipulate settings in a dashboard, based on time or other input values to allow a user to create different views of score data on the customer dashboard.

An API data feed is enabled with proper agreements for API users to subscribe to a raw feed of score data.

Initial unit count weights (maximum and minimum) are established to determine average raw unit counts to create a basis indicator for score display.

A quick score based on a scale of 0-100 is displayed. The quick score displays a value between 0-100 versus a unit count average based on a current percentage of a maximum unit count over time.

The quick score is updated such that it scales dynamically to reference a new maximum unit count in the unit count database if a new maximum value is created.

Each score value may be re-established (reset) at a certain time each day (such as 12:01 am) to position the current unit count or quick score to 0. As a result, the score a customer views will represent the % of search for the day versus a prior 3 months' average, for example.

Thus, while investing firms routinely offer stock quotes (real-time or delayed), mere access to a quote alone does not produce an advantage between one investor and another. Additional information is needed to make a quotation for a financial instrument more valuable to the clients of a brokerage firm or a financial services company. By adding a score generated as described above as a new dimension to a quote, a brokerage firm can provide added relevance and a possible edge to its clients over investors at other firms, who lack a quantified search interest value reflected in the scores.

CONCLUSION

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A. The term subset does not necessarily require a proper subset. In other words, a first subset of a first set may be coextensive with (equal to) the first set.

In this application, including the definitions below, the term "module" or the term "controller" may be replaced with the term "circuit." The term "module" may refer to, be part of, or include processor hardware (shared, dedicated, or group) that executes code and memory hardware (shared, dedicated, or group) that stores code executed by the processor hardware.

The module may include one or more interface circuits. In some examples, the interface circuit(s) may implement wired or wireless interfaces that connect to a local area network (LAN) or a wireless personal area network (WPAN). Examples of a LAN are Institute of Electrical and Electronics Engineers (IEEE) Standard 802.11-2016 (also known as the WIFI wireless networking standard) and IEEE Standard 802.3-2015 (also known as the ETHERNET wired networking standard). Examples of a WPAN are the BLUETOOTH wireless networking standard from the Bluetooth Special Interest Group and IEEE Standard 802.15.4.

The module may communicate with other modules using the interface circuit(s). Although the module may be depicted in the present disclosure as logically communicating directly with other modules, in various implementations the module may actually communicate via a communications system. The communications system includes physical and/or virtual networking equipment such as hubs, switches, routers, and gateways. In some implementations, the communications system connects to or traverses a wide area network (WAN) such as the Internet. For example, the communications system may include multiple LANs connected to each other over the Internet or point-to-point leased lines using technologies including Multiprotocol Label Switching (MPLS) and virtual private networks (VPNs).

In various implementations, the functionality of the module may be distributed among multiple modules that are connected via the communications system. For example, multiple modules may implement the same functionality distributed by a load balancing system. In a further example, the functionality of the module may be split between a server (also known as remote, or cloud) module and a client (or, user) module.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of a non-transitory computer-readable medium are nonvolatile memory devices (such as a flash memory device, an erasable programmable read-only memory device, or a mask read-only memory device), volatile memory devices (such as a static random access memory device or a dynamic random access memory device), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

The computer programs include processor-executable instructions that are stored on at least one non-transitory computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, JavaScript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

The invention claimed is:

1. A system comprising:
memory hardware; and
processor hardware configured to execute code stored by the memory hardware, the code implementing:
a data acquisition module configured to:
acquire data from a plurality of sources of search query data via a communications network, wherein the data indicates searches performed at a plurality of search engines; and
identify a set of search terms from the data;
a count determining module configured to determine a number of times each of the identified set of search terms was searched and to generate a search count for each of the identified set of search terms;
a classification module configured to classify, based on predetermined criteria, the searches for the identified set of search terms as being active or passive;
a weight determining module configured to:
assign weights according to predetermined rules to each of the searches based on whether each of the searches is active or passive, where an active search is assigned a greater weight than a passive search; and
generate weighted search counts by multiplying the search counts with respective weights;
a score generating module configured to generate a score for a first search term from the identified set of search terms as a ratio of a sum of the weighted search counts for the first search term to an average of previously generated weighted search counts for the first search term accumulated over a period of time, wherein the score indicates an interest level in the first search term; and
a query processing module configured to, in response to receiving a query for a current assessment for the first search term via the communications network:
obtain the current assessment for the first search term;
obtain the score for the first search term from the score generating module; and
send a response to the query via the communications network,
wherein the response includes the score for the first search term and the current assessment for the first search term.

2. The system of claim 1 wherein obtaining the current assessment for the first search term includes obtaining a current price of an asset indicated by the first search term.

3. The system of claim 2 wherein the query processing module is configured to:
associate a hyperlink to with the score, wherein the hyperlink is configured to provide additional information about the score, the asset indicated by the first search term, or both; and
include the hyperlink in the response.

4. The system of claim 3 wherein the query processing module is configured to:
receive an indication of activation of the hyperlink; and
send the additional information in response to the activation of the hyperlink.

5. The system of claim 3 wherein:
the current assessment for the first search term comprises a plurality of parameters; and
the system further comprises a charting module configured to generate as the additional information at least one of:
a chart of scores for the first search term over a period of time;
a chart of scores for the first search term versus one of the parameters for the first search term over a period of time; and
a chart of scores for the first search term versus scores for a second search term over a period of time.

6. The system of claim 1 further comprising:
a news processing module configured to receive a plurality of news items from over a period of time to associate with the first search term; and
a statistical analysis module configured to:
obtain a first score for the first search term from a date of a first news item of the plurality of news items; and
determine a statistical significance of the first news item based on the first score and scores for the first search term over the period of time,
wherein the news processing module is configured to determine whether to emphasize or de-emphasize the first news item based on the statistical significance of the first news item.

7. The system of claim 1 wherein:
the data acquisition module is configured to acquire additional data associated with searches performed for the first search term from the plurality of sources during a day; and
the score generating module is configured to update the score for the first search term during the day based on the additional data.

8. The system of claim 1 wherein:
the data acquisition module is configured to acquire additional data associated with searches performed for the search terms from the plurality of sources during a day; and
the score generating module is configured to:
generate scores for the search terms during the day based on the additional data; and
accumulate the scores in a database.

9. The system of claim 1 wherein:
the data acquisition module is configured to acquire additional data associated with searches performed for the search terms from the plurality of sources during a day; and
the weight determining module is configured to:
generate additional weighted search counts for the search terms during the day based on the additional data; and
accumulate the additional weighted search counts for the search terms in a database.

10. The system of claim 1 wherein the score generating module is configured to reset to zero scores for the search terms at a time of a day.

11. The system of claim 1 wherein the data acquisition module is configured to acquire a portion of the data from one or more of the plurality of sources with permission from the one or more of the plurality of sources and by accessing the one or more of the plurality of sources via an application programming interface.

12. A non-transitory computer-readable medium storing processor-executable instructions, the instructions comprising:
  acquiring data from a plurality of sources of search query data via a communications network, wherein the data indicates searches performed at a plurality of search engines;
  identifying a set of search terms from the data;
  determining a number of times each of the identified set of search terms was searched;
  generating a search count for each of the identified set of search terms based on the number of times each of the identified set of search terms was searched;
  classifying, based on predetermined criteria, the searches for the identified set of search terms as being active or passive;
  assigning weights according to predetermined rules to each of the searches based on whether each of the searches is active or passive, where an active search is assigned a greater weight than a passive search;
  generating weighted search counts by multiplying the search counts with respective weights;
  generating a score for a first search term from the identified set of search terms as a ratio of a sum of the weighted search counts for the first search term to an average of previously generated weighted search counts for the first search term accumulated over a period of time, wherein the score indicates an interest level in the first search term;
  receiving a query for a current assessment for the first search term via the communications network;
  obtaining the current assessment for the first search term;
  obtaining the score for the first search term; and
  sending a response to the query via the communications network,
  wherein the response includes the score for the first search term integrated with the current assessment for the first search term.

13. The non-transitory computer-readable medium of claim 12 wherein obtaining the current assessment for the first search term includes obtaining a current price of an asset indicated by the first search term.

14. The non-transitory computer-readable medium of claim 13 wherein the instructions further comprise:
  configuring a hyperlink to provide additional information about at least one of the score and the asset indicated by the first search term;
  associating the hyperlink with the score; and
  including the hyperlink in the response.

15. The non-transitory computer-readable medium of claim 14 wherein the instructions further comprise:
  receiving an indication of activation of the hyperlink; and
  sending the additional information in response to the activation of the hyperlink.

16. The non-transitory computer-readable medium of claim 14 wherein the current assessment for the first search term comprises a plurality of parameters, and wherein the instructions further comprise generating the additional information by at least one of:
  generating a chart of scores for the first search term over a period of time;
  generating a chart of scores for the first search term versus one of the parameters for the first search term over a period of time; and
  generating a chart of scores for the first search term versus scores for a second search term over a period of time.

17. The non-transitory computer-readable medium of claim 12 wherein the instructions further comprise:
  receiving a plurality of news items from over a period of time to associate with the current assessment for the first search term;
  obtaining a first score for the first search term from a date of a first news item of the plurality of news items;
  determining a statistical significance of the first news item based on the first score and scores for the first search term over the period of time; and
  determining whether to emphasize or de-emphasize the first news item based on the statistical significance of the first news item.

18. The non-transitory computer-readable medium of claim 12 wherein the instructions further comprise:
  acquiring additional data associated with searches performed for the first search term from the plurality of sources during a day; and
  updating the score for the first search term during the day based on the additional data.

19. The non-transitory computer-readable medium of claim 12 wherein the instructions further comprise:
  acquiring additional data associated with searches performed for the search terms from the plurality of sources during a day;
  generating scores for the search terms during the day based on the additional data; and
  accumulating the scores in a database.

20. The non-transitory computer-readable medium of claim 12 wherein the instructions further comprise:
  acquiring additional data associated with searches performed for the search terms from the plurality of sources during a day;
  generating additional weighted search counts for the search terms during the day based on the additional data; and
  accumulating the additional weighted search counts for the search terms in a database.

21. The non-transitory computer-readable medium of claim 12 wherein the instructions further comprise resetting to zero scores for the search terms at a time of a day.

22. The non-transitory computer-readable medium of claim 12 wherein the instructions further comprise:
  acquiring a portion of the data from one or more of the plurality of sources with permission from the one or more of the plurality of sources; and
  accessing the one or more of the plurality of sources via an application programming interface.

* * * * *